Dec. 14, 1926.  
H. MISCAMPBELL  
LIME HYDRATOR  
Filed Nov. 15, 1924
1,610,572
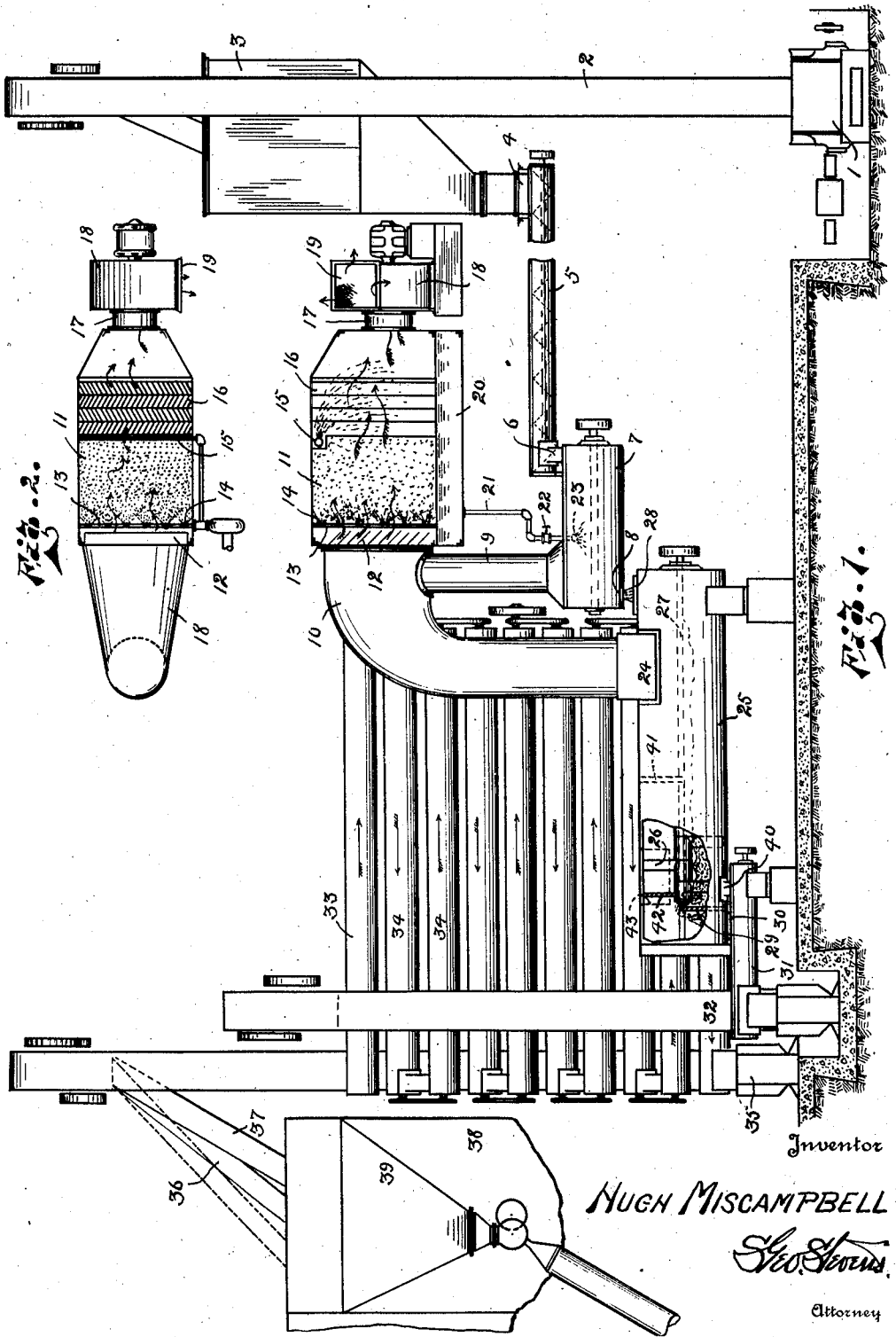
Inventor  
HUGH MISCAMPBELL  
Geo. Stevens  
Attorney Patented Dec. 14, 1926.

1,610,572

UNITED STATES PATENT OFFICE.

HUGH MISCAMPBELL, OF DULUTH, MINNESOTA.

LIME HYDRATOR.

Application filed November 15, 1924. Serial No. 750,040.

This invention relates to lime hydrators and has special reference to a novel combination of elements and method.

The principal object of the invention is to produce as simple and efficient a hydrating unit as possible.

Another object is that of simplicity of elimination of waste material during the hydrating process.

Still other objects and advantages will appear in the further description of the invention.

Referring now to the accompanying drawing, in which like reference characters indicate like parts:

Figure 1 is an elevation of a hydrating unit embodying the invention, and

Figure 2 is a top view, partly in section and partly in elevation, of the lime dust precipitating device.

1 represents a modern lime stone crusher or pulverizer of any well known type, preferably installed beneath the surface of the ground upon which the major portion of the unit is located. From this crusher is extended a vertical elevator shaft 2, discharging into the hopper 3 at the lower end of which is installed preferably a reciprocating feeding device 4 which feeds the crushed limestone from the storage hopper into the spiral conveyor trough 5, disposed horizontally and discharging as at 6 into a paddle or spiral mixing trough 7, in which the limestone is forced longitudinally from the receiving end to the discharge opening 8. Above and adjacent the discharge end of the trough 7 is an upwardly extending pipe 9 through which the fumes from the mixer are drawn into the steam and dust conduit 10 which is arcuate in shape and opens into the cylindrical washing chamber 11, said discharge opening being equipped with a plurality of preferably oblique baffle plates 12 in front of which are disposed a plurality of vertically disposed supply pipes 13 having spaced nozzles their entire length as indicated at 14, the same being for the purpose of discharging water in the form of a spray into and longitudinally of the washing chamber 11, so that as dust laden steam or fumes are drawn into the chamber they immediately contact a spray of water normally having a tendency to precipitate the granular substance in the volume treated. Another horizontally disposed spray pipe, indicated at 15, is provided approximately midway the length of the washing chamber and the upper portion thereof for the purpose of further washing of the volume passing through the chamber. This horizontal pipe is installed just in front of what is shown as a series of oblique baffles indicated at 16 which may be of the desired number to function to the best advantage possible. While the terminous of the washing chamber in plan view is somewhat constricted or cone-like in shape the frustrated end terminating in the flue 17 leading to the suction fan 18, the discharge 19 of which may be connected with any form of ultimate discharge, the washing chamber is superimposed upon a tank-like structure 20 in which the water with its precipitate is collected and from which the discharge pipe 21 leads to the primary mixer 7 just in front of the entrance of the pipe 9 thereupon, said water supply pipe being controlled as by a valve 22 and provided directly within the upper portion of the mixer with a spray nozzle 23 which supplies the initial bath for the lime as it is being forced longitudinally of the primary mixer, immediately after which bath the slacking process commences, the resultant steam and vapor being drawn off through the pipe 9, before described.

The conduit 10 leads downwardly and is engaged as at 24 with the upper forward portion of the ultimate cooler and mixer, which is a horizontally disposed cylindrical trough or chamber 25 having revolving paddles 26 therein upon an axial shaft 27 which mixes and conveys the material from the receiving end to the discharging end thereof. At the receiving end of the cooler and mixer 25 is a flanged opening indicated at 28 into which the discharge from the primary mixer 7 passes, and is conveyed longitudinally of the cooler and mixer.

The cooling and mixing chamber 25 is provided adjacent its discharge end with an upright dam indicated at 29 extending upwardly and covering the entire lower half of the chamber, between which dam and the extreme adjacent end of the chamber 25, in the lower portion thereof, is a suitably controlled discharge opening 30 which discharges into the screw conveyor trough 31, from which the lime thus treated is discharged into the vertically disposed elevator leg 32 and conveyed upwardly to and discharged into the uppermost horizontally disposed spiral conveyor trough 33, beneath which are any desired number of similar troughs 34 in which the product is ultimately cooled and finished by its being conveyed longitudinally of one trough in one direction, dropped into the next succeeding trough and conveyed in the opposite direction, then dropped into the third trough and conveyed backwardly again and so on downwardly until it ultimately arrives at the foot of another vertically disposed elevator leg 35 where it is elevated once more and optionally discharged as through either one of the two spouts indicated at 36 and 37 into suitable storage bins, one being indicated at 38 and a small hopper indicated at 39 which may lead to another pulverizer, if so desired, for transformation into a special product when same is required, such pulverizer not being shown as forming part of my present invention.

Forwardly of the dam 29 in the cooling and finishing chamber 25 is located a suitably controlled discharge orifice 40, through which, when desired, the coarser or less finished material remaining in the lower half of the cooler 25, by virtue of its not being able to pass up over the dam 29, may be discharged into the screw conveyor 31 and conducted from thence directly into the elevator leg 35 to one of the storage bins, or to an ultimate pulverizer or crusher, thus providing convenient means for caring for what are known as tailings of such a device.

A dam 41 is shown as installed approximately centrally of the chamber 25 and transverse the upper half thereof to prevent an abnormal volume of dust working its way back and into the conduit 10 as such lighter product, rising from the slacking lime being conveyed under that portion of the chamber, is practically a finished product, and if there confined will ultimately join the coarser granular material and accompany it through the conveyor 31, thus becoming saved as part of the product of the machine; while the dust and steam rising from the material as it is discharged into the chamber 25 forwardly of the dam 41 will as is obvious be drawn off through the conduit 10, be thoroughly washed in the washer 11, and again accompany the water through the pipe 21 into the primary mixer 7, again becoming processed in its subsequent passage through the machine.

A shorter vertically disposed dam is shown at 42 within the chamber 25 and just forwardly of the upper edge of the dam 29, which is for the purpose of forming a baffle to the substance being conveyed in the chamber to prevent the paddles from lifting the coarser material over the dam 29. An opening or manhole is indicated at 43 for convenient access to the interior of the chamber 25, it being located in close proximity to the dams 29 and 42 so that the same may be conveniently watched for best results.

From the foregoing it is evident that I have produced a simple and compact unit for the hydrating of lime and one susceptible of most delicate adjustment in producing various results in an ultimate product, and, furthermore, one in which the maximum of economy is accomplished particularly by the collection and retreating of the finer products of the process which are usually considered as wasted.

Having thus described my invention, what I claim and desire to secure by Letters Patent, is:

1. A lime hydrator of the character described comprising a horizontally disposed mixing chamber, means at one end of the mixing chamber for continuously feeding freshly bathed ground lime thereto, and means at the opposite end of the mixing chamber for preventing discharge of the heavier product.

2. A lime hydrator of the character described comprising a horizontally disposed mixing chamber, means at one end thereof for continuously feeding freshly bathed ground lime thereto, and means at the opposite end of the mixing chamber for the continuous discharge of the lightermost hydrated product, said discharge means comprising a lowermost baffle or dam transverse the mixing chamber and a second baffle or dam adjacent said last mentioned dam and transverse the upper approximate half of the mixing chamber.

In testimony whereof I hereunto affix my signature.

HUGH MISCAMPBELL.